3,189,644
$C_{4-6}$ PERFLUORINATED GLYCOL DIESTERS OF TRIMETHYLACETIC ACID
Jonathan L. Snead and Henry Gisser, Philadelphia County, Pa., assignors to the United States of America as represented by the Secretary of the Army
No Drawing. Filed Feb. 25, 1963, Ser. No. 260,922
4 Claims. (Cl. 260—488)
(Granted under Title 35, U.S. Code (1952), sec. 266)

The invention described herein may be manufactured and used by or for the Government for governmental purposes without the payment to us of any royalty thereon.

This invention relates to improved fluoroalcohol esters and particularly, to fluoroalcohol esters which exhibit good oxidation and thermal stability and have a wide liquidus range.

The preparation of fluoroalcohol esters is disclosed in the prior art and the greater stability of such esters as compared with corresponding non-fluorinated esters has been shown experimentally. However, the use of fluoroalcohol esters is still limited by such stability, and in many applications more stability at higher temperatures is required. For example, many practical applications necessitate exposure to temperatures of approximately 500° F. At such temperatures the prior art fluoroalcohol esters are not oxidatively stable for more than very short periods of time, e.g., 24 to 72 hours, or are not sufficiently non-volatile or do not exhibit a sufficiently wide liquidus range for practical utility.

Accordingly, a principal object of the present invention is to provide fluoroalcohol esters which exhibit superior oxidation stability.

Another object of the invention is to provide fluoroalcohol esters which exhibit superior oxidation and thermal stability.

Other objects of the invention will in part be obvious and in part appear hereinafter in the detailed description.

The present invention involves the concept that elimination of secondary and tertiary carbon-hydrogen bonds from the acid moiety of fluoroalcohol esters results in improved oxidation and thermal stability.

During the course of the investigation on this invention, neopentyl and neopentyl-like chemical structures of acids were incorporated through synthesis into fluoroalcohol and fluoroglycol esters. Table I lists the various esters produced together with the several physical properties measured.

*Table I*

| No. | Ester | Vacuum boiling point (° C./mm. Hg) | Refractive index (at 25° C.) | Density, gms./cc. (at 25° C.) |
|---|---|---|---|---|
| 1 | Tetrafluorobutyl-1,4-bis(trimethylacetate). | 78/0.35 | 1.3930 | 1.1192 |
| 2 | Tetrafluorobutyl-1,4-bis-(3,3-dimethylbutyrate). | 100/0.35 | 1.4047 | 1.0985 |
| 3 | Hexafluoropentyl-1,5-bis(trimethylacetate). | 86/0.35 | 1.3854 | 1.1852 |
| 4 | Hexafluoropentyl-1,5-bis(3,3-dimethylbutyrate). | 108/0.35 | 1.3973 | 1.1609 |
| 5 | Octafluorohexyl-1,6-bis(trimethylacetate). | 94/0.35 | 1.3778 | 1.2512 |
| 6 | Octafluorohexyl-1,6-bis-(3,3-dimethylbutyrate). | 116/0.35 | 1.3899 | 1.2233 |
| 7 | Hexafluoropentyl-1,5-bis(n-hexanoate). | 137/0.8 | 1.3996 | 1.1676 |
| 8 | Hexafluoropentyl-1,5-bis(2,2-dimethylbutyrate). | 130/0.62 | 1.3961 | 1.1647 |
| 9 | Bis (1H,1H,7H-dodecafluoroheptyl)3,3-dimethylglutarate. | 143/0.33 | 1.3528 | 1.6140 |

The esters listed in Table I were prepared by a commonly known and conventional method. Specifically, the esters were prepared by direct esterification by reaction of fluoroalcohol and acid in the presence of a mineral acid catalyst. A solvent which forms an azeotrope was used and the water formed was removed by refluxing into a Dean-Stark trap.

Studies were conducted on various samples of the prepared esters to determine oxidation stability at different temperature levels. In this connection a dynamic test was employed similar to that described in the federal specification for "Lubricants, Liquid Fuels, and Related Products; Methods of Inspection, Sampling, and Testing" VV-L-791e, May 21, 1953, Method 5308.3 entitled "Corrosiveness and Oxidation Stability of Light Oils." In accordance therewith, duplicate 10 gram ester samples were tested at temperatures ranging from 345° F. to 482° F. in the presence of copper, steel and aluminum catalyst strips (1.750 x 0.375 x 0.025 inches). The tests were conducted in an aeration-type glass apparatus through which clean, dry air was bubbled at the rate of 1.2 liters per hour. Effluent gas was collected in an 0.1 N potassium hydroxide solution. The usual criteria of induction period (based on increase in acidity), changes in viscosity, color, etc. were employed to indicate stability. Results are given in Table II.

*Table II*

AT 347° F.

| Ester No. | Induction period (hours) | Viscosity increase* (percent) | Neutralization number (eq. mg. KOH/gm.) | | Sample appearance |
|---|---|---|---|---|---|
| | | | Volatile | Non-volatile | |
| 7 | <24 | 37.8 | 39.3 | 26.7 | Dark; sludge. |
| 3 | >168 | 0 | 0.06 | 0 | Clear; colorless. |
| 8 | >168 | 12.6 | 2.6 | 2.4 | Amber. |
| 4 | >168 | 9.6 | 3.5 | 5.4 | Turbid. |
| 10 | >168 | 6.9 | 3.6 | 2.5 | Amber. |
| 11 | >168 | 3.1 | 1.6 | 1.2 | Amber; sediment. |
| 12 | >168 | 2.4 | 0.5 | 0.1 | Do. |

AT 392° F.

| 5 | >168 | 0.1 | 0.2 | 0.6 | Clear; colorless. |
| 6 | 168 | 14.2 | 9.5 | 1.8 | Turbid. |

AT 482° F.

| 1 | >168 | 2.8 | 1.9 | 2.8 | Clear; colorless. |
| 2 | <24 | 25 | 3.9 | 8.6 | Dark; sludge. |
| 3 | >168 | 3.6 | 2.6 | 1.1 | Clear; colorless. |
| 4 | <24 | 32 | 10.7 | 7.4 | Dark; sediment. |
| 5 | >168 | 1.8 | 4.5 | 0.9 | Clear; colorless. |
| 6 | <24 | 42 | 8.6 | 4.5 | Dark; sediment. |
| 11 | 24 | −6.6 | 3.7 | 1.4 | Do. |
| 9 | 168 | −11.1 | 16.3 | 5.2 | Amber. |
| 12 | <72 | −14.9 | 6.0 | 2.9 | Dark; sediment. |

*Based on viscosity at 100° F.

NOTE.—Esters 10, bis(1H,1H,5H-octafluoropentyl) 3-methylglutarate, and 11, bis(1H,1H,7H-dodecafluoroheptyl) 3-methylglutarate, disclosed by Faurote et al.: Journal of Industrial and Engineering Chemistry, vol. 48, pp. 445-454 (1956), and ester 12, a fluoroalkyl camphorate, disclosed by E. I. du Pont de Nemours: Product Information Bulletin "Stable Fluids—The Fluoroalkyl Camphorates," are representative of the best prior art oxidatively stable fluids and are included for comparison purposes.

Analysis and interpretation of the oxidation data of Table II indicate that at the lowest test temperature (347° F.) there is a difference in stability among the esters. Data for ester 3 (representative of an embodiment of the invention) are indicative of improved stability. In contrast thereto, ester 7 proved to be very unstable as evidenced by the severe oxidation resulting after only a few hours. The presence of secondary carbon-hydrogen bonds in ester 7 and the absence of said groups in ester 3 supports the contention that the presence of secondary carbon-hydrogen bonds affect stability detrimentally. At 392° F. differences in stability between ester 5 and ester 6 are apparent. This again supports the aforementioned contention since ester 5 contains no secondary carbon-hydrogen bonds while ester 6 contains four such bonds.

At 482° F. it is observed that a marked contrast exists between the fluoroglycol esters lacking secondary carbon-hydrogen bonds and those containing such bonds. Perfluorobutyl-, perfluoropentyl-, and perfluorohexylacetate esters (esters 1, 3 and 5, respectively) were very stable and exhibited low increases in viscosity and acidity. At the end of 168 hours these esters were relatively unchanged—clear, colorless and without sludge or sediment. The 3,3-dimethylbutyrates (esters 2, 4 and 6), however, were severely oxidized in less than 24 hours and exhibited high increases in viscosity and acidity as well as the formation of insolubles. This striking difference in stability is attributed to the presence of secondary carbon-hydrogen bonds in the latter esters which act as initial reaction sites for oxidative break-down. Similarly, inventive esters 1, 3 and 5 are much more stable to oxidation than prior art esters 11 and 12, in that the former have much longer induction periods, develop much less acid and exhibit no color change or sediment throughout the test period.

Considerable improvement in the oxidation stability of ester 11 is noted when the tertiary carbon-hydrogen bond is replaced with a methyl group as shown by ester 9.

The inventive esters, esters 1, 3 and 5, were oxidized at 482° F. until oxidative break-down was obvious and the induction periods therefor were determined. Each of these esters had induction periods between 500 and 600 hours during a prolonged oxidation test (1000 hours).

Several esters representative of those listed in Table I were tested for thermal stability. About 5 grams of each were sealed under vacuum in a nitrogen atmosphere in a Pyrex glass ampoule and maintained at 500° F. Changes in viscosity and neutralization number were used as criteria of thermal stability. The test data are set forth in Table III below.

*Table III*

| Ester No. | Hours at 500° F. | Final appearance | Viscosity change* (percent) | Neutralization number increase (eq. mg. KOH/gm.) |
|---|---|---|---|---|
| 3 | 72 | Clear; colorless | 0 | 0 |
| 4 | 72 | Amber | +0.6 | 0.7 |
| 1 | 168 | Clear; colorless | 0 | 0 |
| 2 | 168 | Amber | +2.0 | 0.8 |
| 11 | 168 | do | −2.3 | 0.6 |
| 9 | 168 | do | −3.1 | 0.7 |

* Based on viscosity at 100° F.

The inventive esters (esters 1 and 3) gave no measurable decomposition even after 168 hours at 500° F. The substantially complete lack of change in physical properties with respect to esters 1 and 3 as contrasted with the other esters tested is proof positive that the absence of secondary carbon-hydrogen bonds in the acid moiety of fluoroalcohol esters significantly enhances thermal stability.

We claim:

1. An oxidatively and thermally stable fluoroglycol ester having the structural formula:

$$CH_3-\underset{\underset{CH_3}{|}}{\overset{\overset{CH_3}{|}}{C}}-CO_2-CH_2-(CF_2)_n-CH_2-O_2C-\underset{\underset{CH_3}{|}}{\overset{\overset{CH_3}{|}}{C}}-CH_3$$

wherein $n$ has a value of 2 to 4.

2. The ester according to claim 1 wherein $n$ has a value of 2.

3. The ester according to claim 1 wherein $n$ has a value of 3.

4. The ester according to claim 1 wherein $n$ has a value of 4.

References Cited by the Examiner

UNITED STATES PATENTS

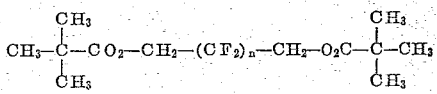

| 3,049,557 | 8/62 | Emrick | 260—410.6 X |
| 3,081,342 | 3/63 | Ver Nooy | 260—485 |
| 3,115,519 | 12/63 | Crouse et al. | 260—488 |

OTHER REFERENCES

Filler et al.: J.A.C.S., 75, 2693–1697 (1953).

LORRAINE A. WEINBERGER, *Primary Examiner.*
LEON ZITVER, *Examiner.*